Dec. 31, 1957      C. E. MILLER      2,817,990
AUTOMATIC LATHE

Filed Oct. 7, 1953      6 Sheets-Sheet 3

Inventor
Carroll E. Miller
by Wright, Brown, Quinby & May
Attys.

Dec. 31, 1957     C. E. MILLER     2,817,990
AUTOMATIC LATHE
Filed Oct. 7, 1953     6 Sheets-Sheet 4
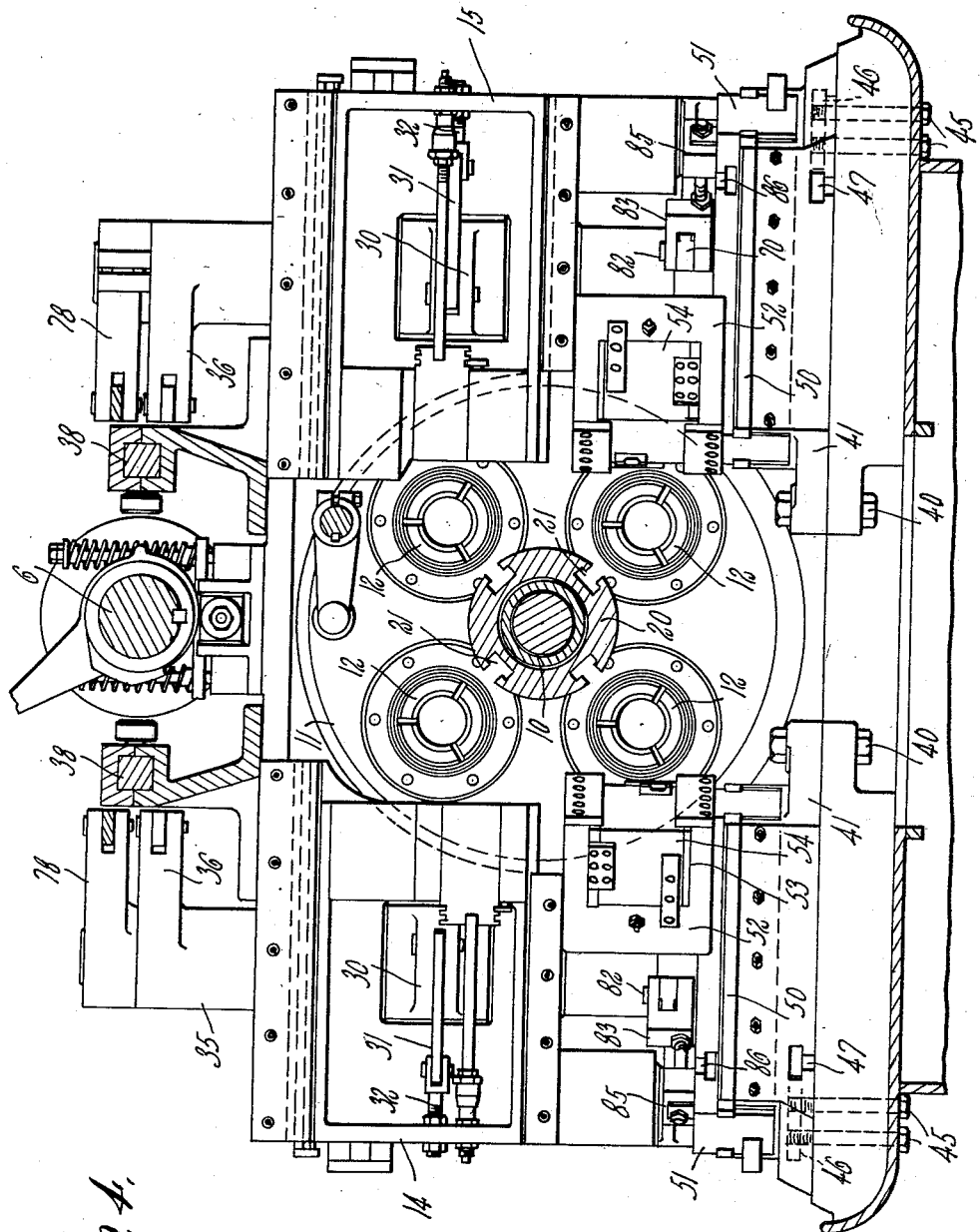

Dec. 31, 1957   C. E. MILLER   2,817,990
AUTOMATIC LATHE
Filed Oct. 7, 1953   6 Sheets-Sheet 5
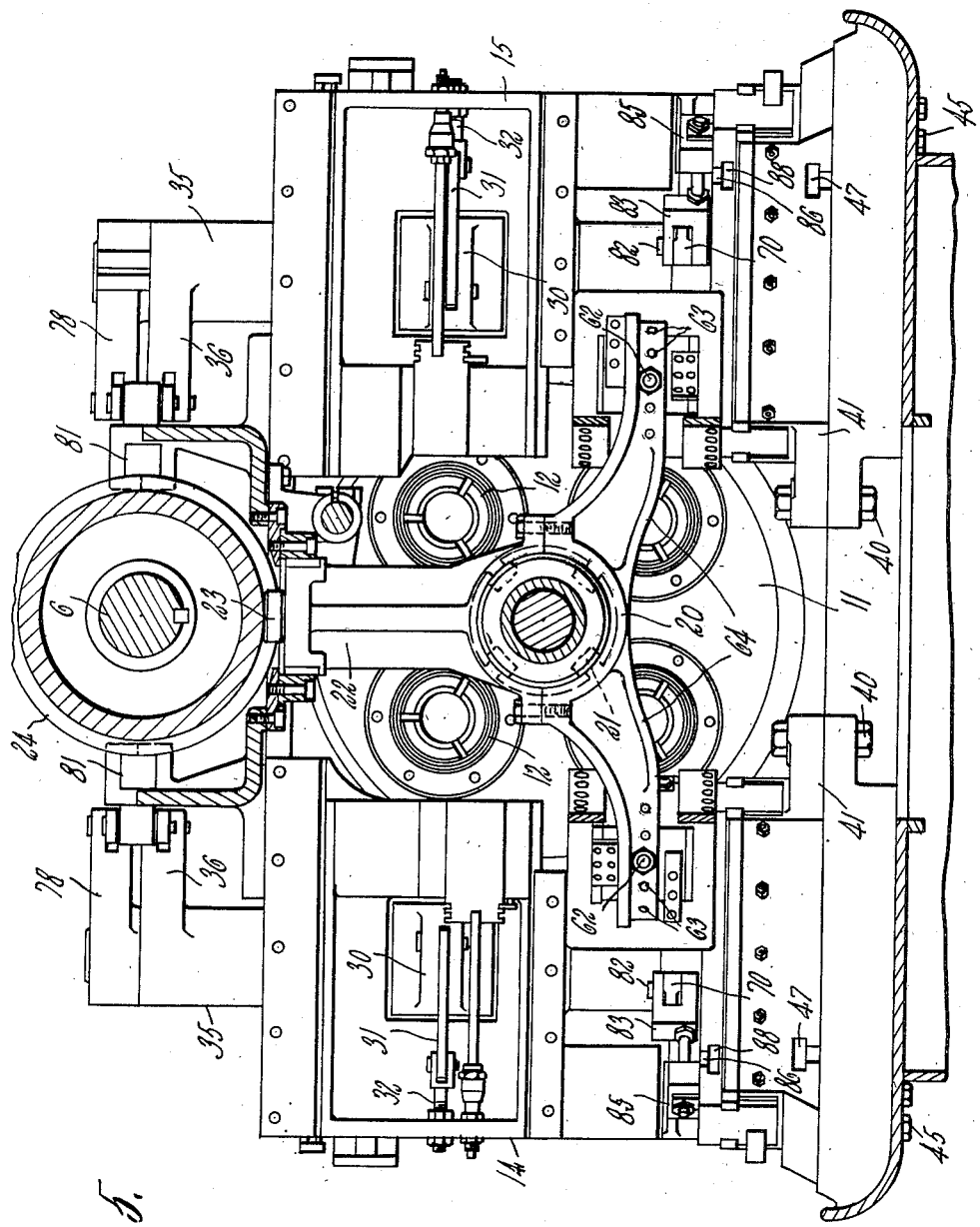

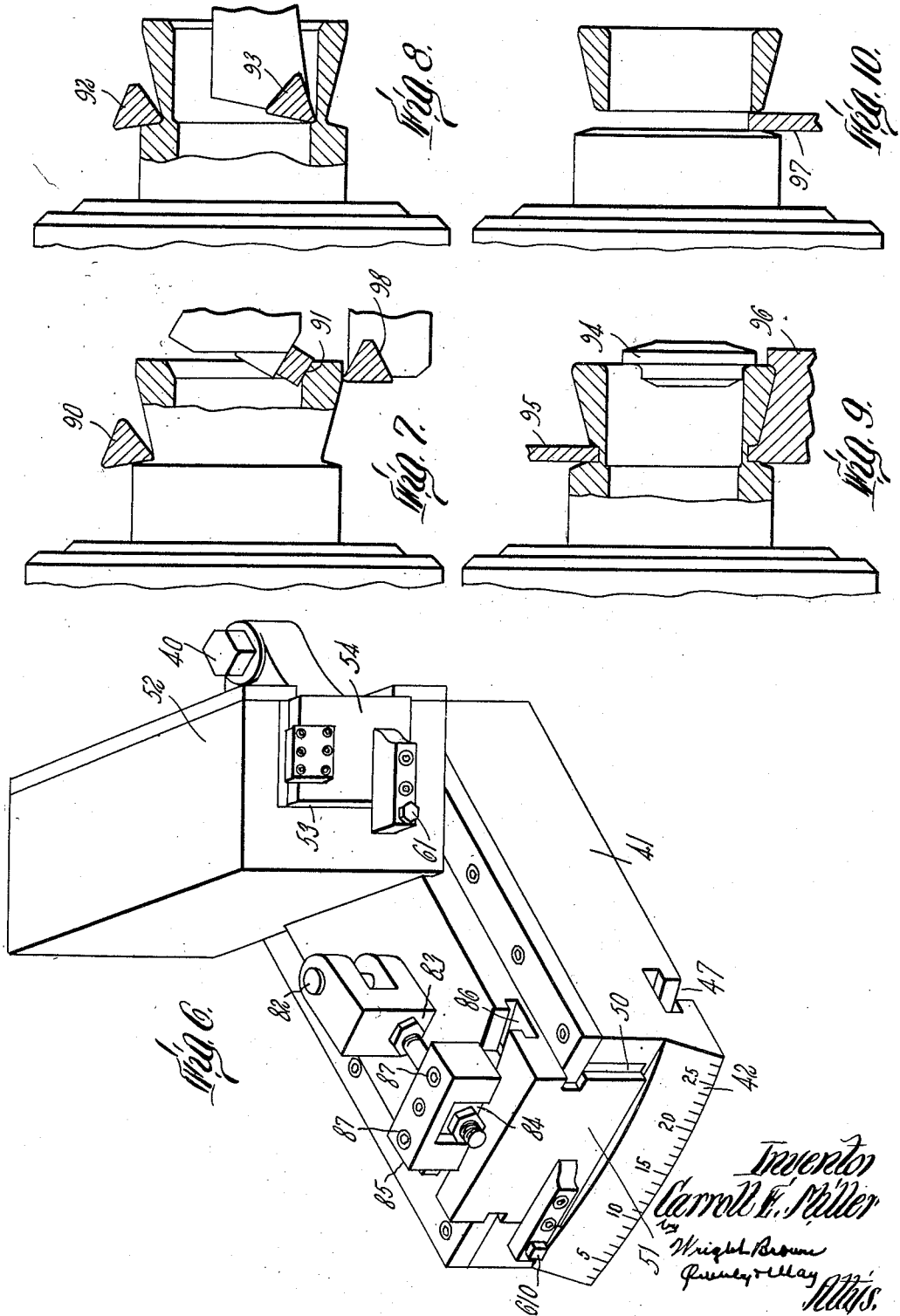

United States Patent Office 2,817,990
Patented Dec. 31, 1957

2,817,990

AUTOMATIC LATHE

Carroll E. Miller, Windsor, Vt., assignor to Cone Automatic Machine Company Inc., Windsor, Vt., a corporation of Vermont Application October 7, 1953, Serial No. 384,656

6 Claims. (Cl. 82—3)

This invention relates to automatic lathes, and more especially to lathes of the multiple spindle type.

It has for an object to provide a novel tool carrier arrangement and mounting by which the cutting of tapers on work pieces is facilitated. This is accomplished in accordance with this invention by substituting for one or more of the usual cross tool slides, a pivoted auxiliary support carrying a pair of slides, one slide carrying the other, the two slides being arranged for linear reciprocation in angularly disposed directions with means by which the slides are so moved and by which one or more tools thereon are caused to traverse a work piece non-parallel to its axis of rotation with the work spindle, the parts being angularly adjustable so that the tool traverses along the desired taper.

Figure 1:
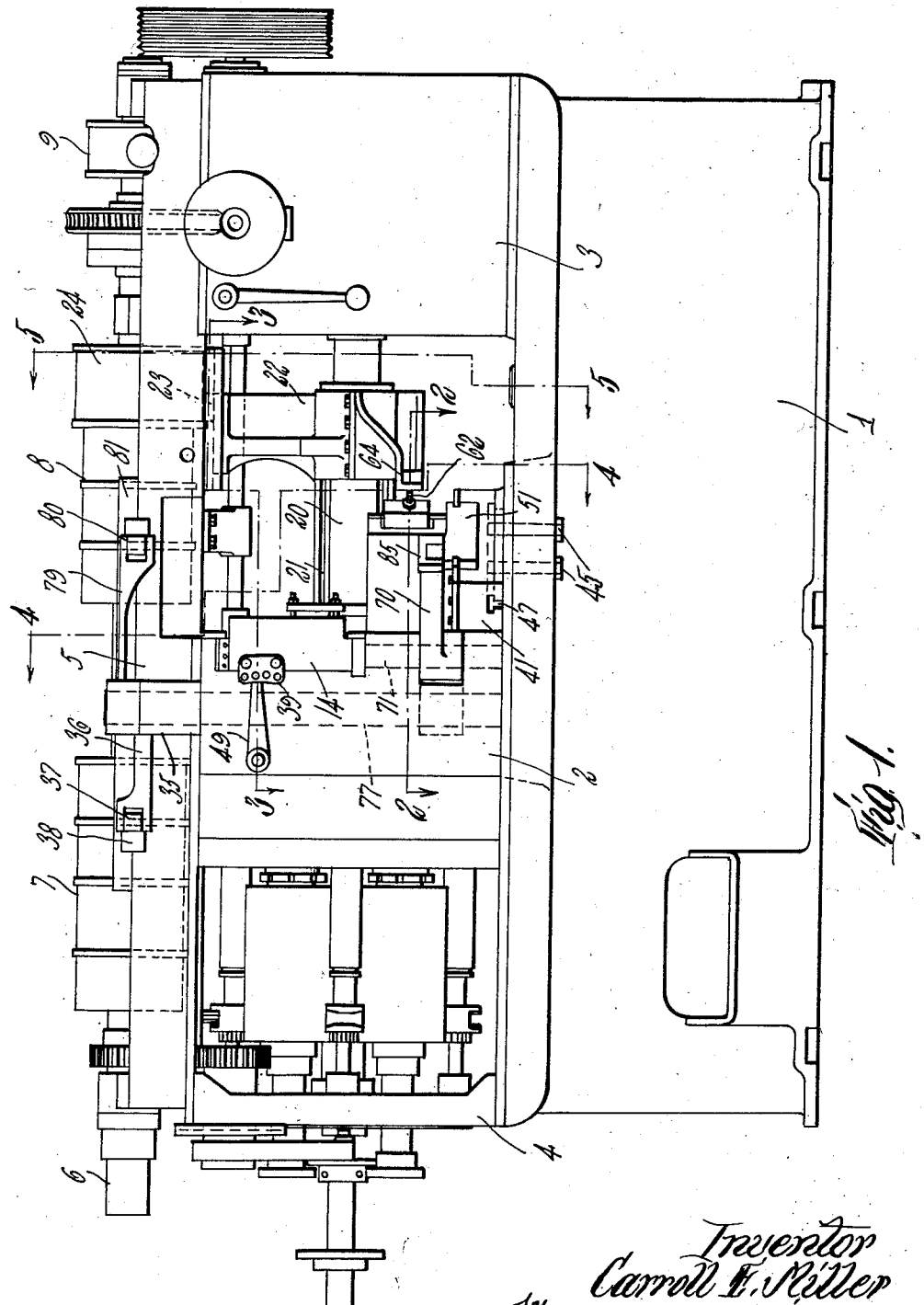

For a complete understanding of this invention, reference may be had to the accompanying drawings in which Figure 1 is a front elevation of a four spindle automatic lathe embodying the invention.

Figures 2 to 5, inclusive, are detail sectional views on the correspondingly numbered section lines of Figure 1.

Figure 6 is an isometric view of the two slides and their immediate parts.

Figures 7 to 10, inclusive, are somewhat diagrammatic views illustrating certain tooling operations which may be carried out by the machine shown in Figures 1 to 6.

This invention is shown as applied to a four spindle automatic lathe of a well known type. This machine comprises a bed 1 having central and end columns 2, 3, and 4, respectively, extending upwardly therefrom. An overhead bed 5 joins the upper ends of these columns and carries journaled therein a cam shaft 6. This cam shaft supports a series of cam drums 7, 8, and 9 for controlling and actuating certain of the parts of the machine.

Within the central column 2 there is journaled as on a horizontal shaft 10, a carrier 11 in which are journaled a series of four work-holding spindles 12. These spindles are arranged parallel to each other and parallel to the shaft 10 on which the carrier is journaled, the spindles being arranged in circular array around the axis of the shaft 10. This carrier is arranged to be indexed to bring the spindles carried thereby successively into the same angular positions with reference to the shaft 10, and in these various positions certain tooling actions take place as is well known in the art.

For the spindles in the upper index positions there are arranged front and back tool-carrying slides 14 and 15 of well known type which are arranged to carry tools for producing desired cutting actions on the ends of bar or tubular stock projecting from the forward ends of the corresponding spindles and forwardly of the forward face of the carrier 11.

These work spindles are rotated by any suitable means not material to this invention, and at certain times they are arranged to be indexed so as to be moved from one to a succeeding station about the axis of the shaft 10. The shaft 10 also carries slidable lengthwise thereon a drum 20, which as shown, may have longitudinal T slots 21 therein to receive various tools or tool holders for operating on the work pieces. This drum 20 has connected thereto an upright arm 22 (see Figure 1) which is slidably carried by the upper bed 5 and has a suitable cam roll 23 thereon engageable with cams on a cam drum 24 carried by the cam shaft 6. This drum 20 is adapted to support end working tools which operate on the work pieces projecting from the forward faces of the spindles at corresponding index positions of the carrier 11 which presents the work pieces successively into the tooling relation to the various tools. The upper tool slides 14 and 15 are actuated by the rocking of arms 30 (see Figure 3) connected to these tool slides 14 and 15 by links 31, each pivoted at one end to one of the arms 30 and at the other end pivoted to longitudinally adjustable elements 32 carried by the respective tool slides. The arms 30 may be keyed to sleeves 35 provided at their upper ends with arms 36 operatively connected to extensions 37 of draw bars 38 movable axially by suitable cams (not shown) on certain of the cam drums 7. This arrangement of the upper tool slides is old and well known. They cooperate successively with positive stops arranged in a bank at 39, there being one stop for each spindle with a movable stop arm 49 arranged to cooperate with the stops in the bank in succession as the various spindles arrive at the corresponding tooling station.

Beneath the upper tool slides 14 and 15 are arranged lower tool slides which are quite different from those heretofore known and which embody features of this invention.

To the upper face of the bed beneath and forwardly of the forward face of the carrier 11 there are pivoted to the base at the pivots 40, a pair of supports 41. The outer ends of these supports may be graduated as shown at 42 and these supports may be clamped in adjusted angular position in accordance with these graduations as by tightening bolts 45 which extend up through the marginal portions of the bed and are threaded into nuts 46 arranged in an undercut arcuate channel 47 in the bases of the supports 41. The arcuate channels 47 are along arcs which are struck from the pivot axes 40 as centers. Each of the supports 41 is provided with a way 50 within which is slidable a main slide 51 arranged to move in a rectilinear direction. This main slide 51 is provided with an upstanding portion 52 in which is provided a way 53 arranged at an angle to the way 50 and at an angle to said axis different from that of the motion of said main slide and within which is slidably mounted a tool slide 54. This tool slide may carry one or more tool bits 55 positioned to operate on the work pieces projecting from the spindles at the two lowest index positions.

It is desirable that the axes of the pivots 40 be located as closely as possible to the cutting edges of the corresponding tool bits 55 so that when adjustments are made on the tool slide to change the angle of cut, the size of the work at the small diameter will be effected to a minimum amount. The tool bits 55 are set first to cut the desired small diameter, and if it is found necessary to adjust for any slight correction in angle, this may be done without appreciable effect on the size of the small diameter.

Figure 2:
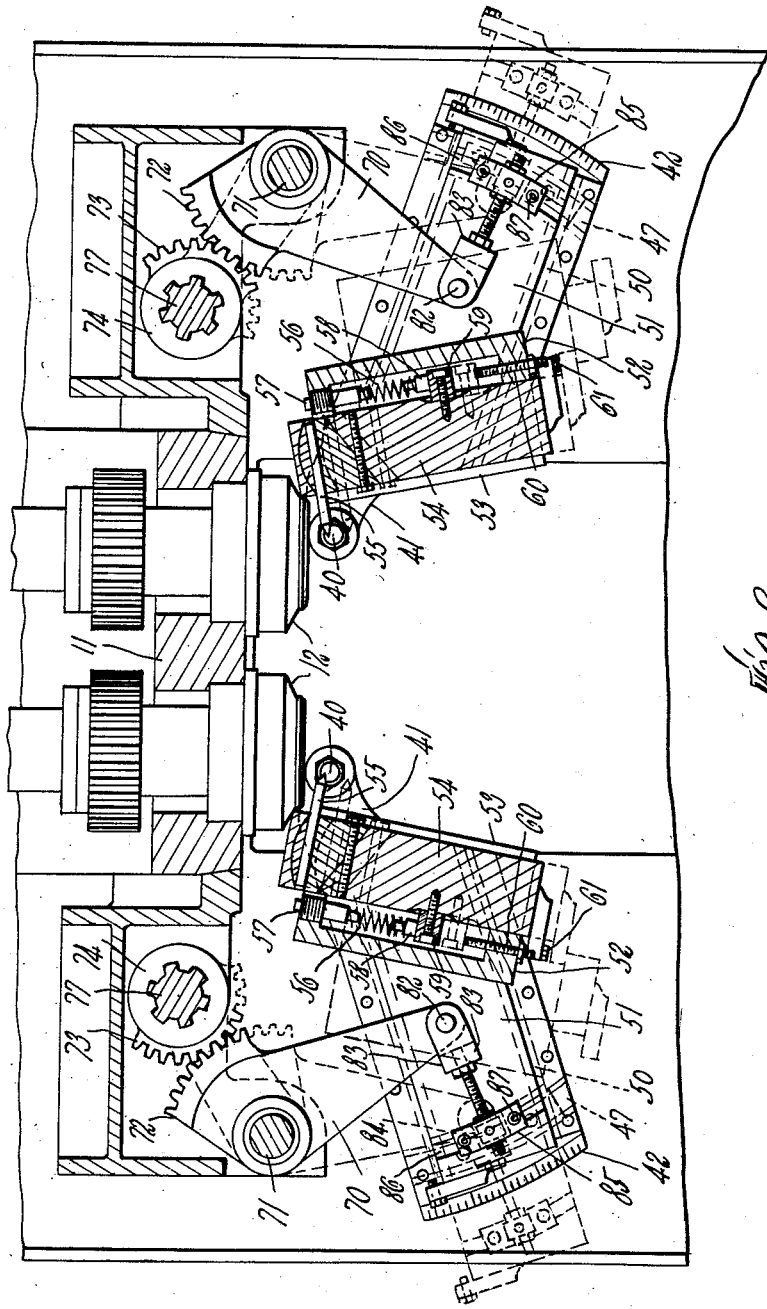
Figure 3:
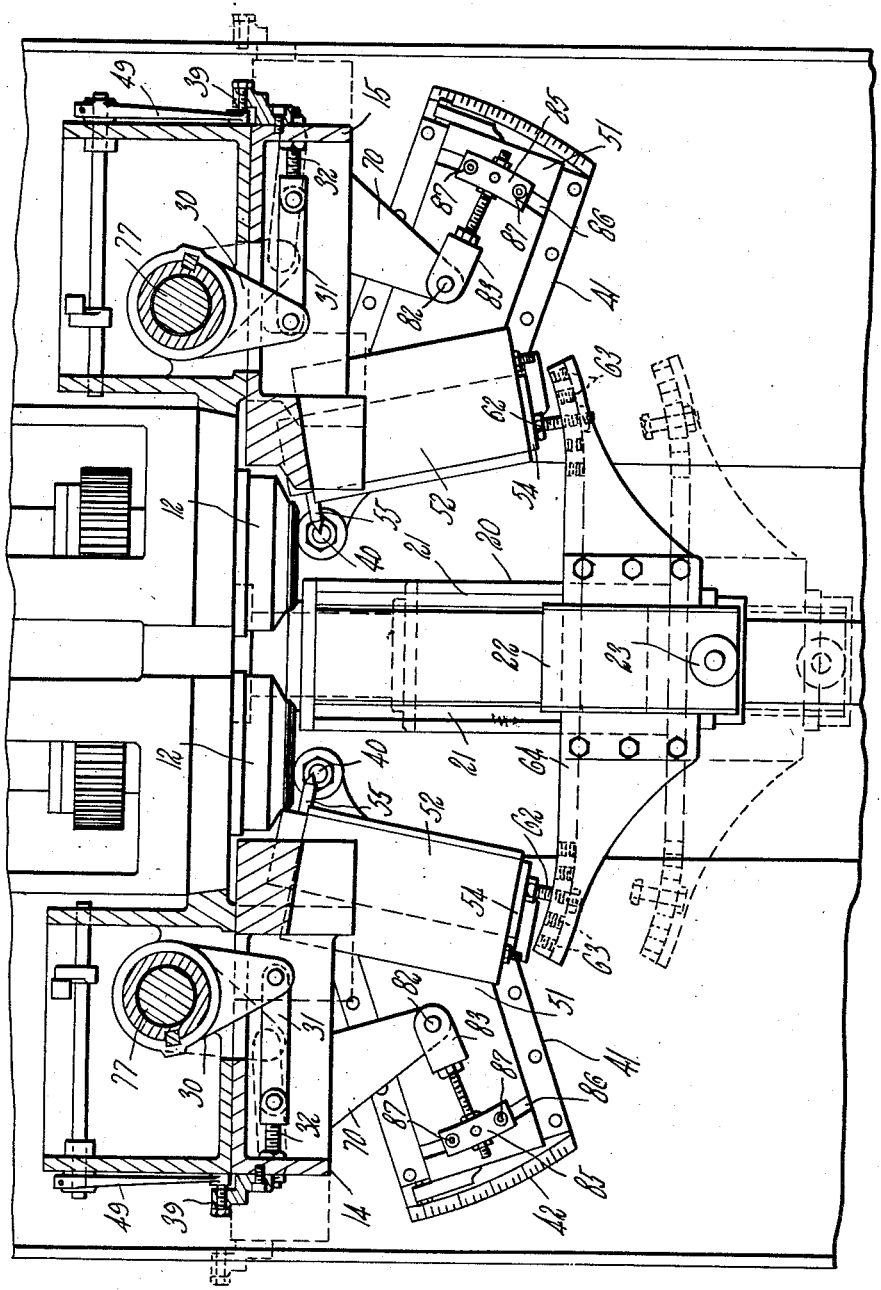

The tool slide 54 is normally held retracted from the forward end of its spindle and the work carried thereby, as shown in Figure 2 as by a spring 56, which reacts between an abutment screw 57 threaded through the end wall of the guide member 52 and at its opposite end an abutment member 58 carried by a block 59 secured to the tool slide 54. This block 59 may be limited in its retracting motion to the tool slide 54, as by an adjustable stop screw 60, and the forward or inward motion of the tool slide may be similarly stopped by the engagement of an adjustable stop screw 61 on the opposite end face of the guide member 52. A similar screw 610 limits the outward motion of the slide 51. Each slide 54 may be moved toward the work piece by the impingement on its rear end of an adjustable bolt 62 threaded through any selected of a series of threaded holes 63 in a lateral extension 64 secured to the member 22, which, in turn, is secured to the bar-carried drum 20. As the arm 22 is moved toward the carrier, the extensions 64 are likewise moved and when the bolts 62 impinge upon the rear ends of the tool slides, they are moved toward the work. On retraction of the drum slide 20, the springs 56 act to retract the tool slides in their guideways.

Besides this motion of the tool slides longitudinally of their ways, they are given a motion which also has a component lengthwise and a component crosswise of the work spindles by means which move the main slides 51. As shown best in Figure 2, this motion is produced by the rocking of a pair of bell crank levers 70 fulcrumed on a pair of upright shafts 71, one arm of each bell crank having a gear segment 72 meshing with a segment 73 on a sleeve 74 splined to a shaft 77 which extends through the sleeve 35 and has fixed to its upper end an arm 78. Each of the arms 78 is connected through a link 79 to an extension 80 of a slide bar 81, the position of which is controlled by cams (not shown) on one of the cam drums 8. The opposite arm of the bell crank lever 70 is pivoted at 82 to an adjustable link 83 which engages a block 84 pivoted to an arcuate block 85 adjustable in an arcuate slot 86 in the outer portion of the main slide 51. This block 85 is adjusted in the slot 86 to a position suitable for the rocking of the bell crank lever to move the main slide in the particular angular position in which it is arranged by reason of the angular adjustment of its support 41. It may be fixed in adjusted position by tightening the two screws 87, the heads of which engage undercut portions 88 of the groove 86.

It will thus be seen that the tool slides 54 are given a compound motion resultant of the motion of each within its own guideway and the motion of the main slide which carries it in its guideway, the second of these motions being controlled by cams on the cam shaft 6, and the first of these motions being controlled by the motion of the bar-carried slide 22 with its tool-carrying drum 20. This tool-carrying drum 20, it will be understood, may carry end working tools suitable for performing other operations on the work piece than those produced by the tools on the tool slides 54.

An example of the type of work suitable to be produced by this machine is shown in Figures 7 to 10 wherein the tools carried by the tool slides 54 cut the tapered portions of the work as shown in Figures 7 and 8 at 90 and 92, one of the tool slides 54 having the tool 90 for rough cutting and the other having the finish cutting tool 92, while other operations not requiring a taper cut, such as forming tools 91, 93, 94 and 98 on the end working drum, and 95 and 96 and a cut-off tool 97, are carried by the upper tool slides at other index positions.

From the foregoing description of an embodiment of this invention it should be evident to those skilled in the art that various changes and modifications may be made therein without departing from its spirit or scope.

I claim:

1. In combination, an indexable carrier, a plurality of parallel work spindles journaled in said carrier in circular array about the axis of rotation of said carrier, a shaft coaxial with said carrier, a slide mounted on said shaft for motion toward and from said carrier, a support pivoted transverse to said axis, means for securing said support in adjusted angular position about its pivot, a main slide mounted on said support for linear motion and having a way thereon arranged at an angle to the direction of linear motion and with a component longitudinally of said axis and at an angle to said axis different from that of the motion of said main slide, a tool slide mounted for motion in said way, a tool carried by said tool slide in position to operate upon a work piece carried by a spindle at one index position of said carrier, means operatively connected to said main slide for moving said main slide, and means carried by said shaft-carried slide operatively connected to said tool slide for moving said tool slide in said way.

2. In combination, an indexable carrier, a plurality of parallel work spindles journaled in said carrier in circular array about the axis of rotation of said carrier, a shaft coaxial with said carrier, a slide mounted on said shaft for motion toward and from said carrier, a support pivoted transverse to said axis, means for securing said support in adjusted angular position about its pivot, a main slide mounted on said support for linear motion and having a way thereon arranged at an angle to the direction of linear motion and with a component longitudinally of said axis and at an angle to said axis different from that of the motion of said main slide, a tool slide mounted for motion in said way, a tool carried by said tool slide in position to operate upon a work piece carried by a spindle at one index position of said carrier, a bell crank lever fulcrumed at a fixed point, a link pivoted at one end to one arm of said lever, an arcuate way on said main slide, a block adjustable in said arcuate way and to which the opposite end of said link is pivoted, and means operatively connected to the opposite arm of said bell crank lever for rocking said lever.

3. In combination, an indexable carrier, a plurality of parallel work spindles journaled in said carrier in circular array about the axis of rotation of said carrier, a shaft coaxial with said carrier, a slide mounted on said shaft for motion toward and from said carrier, a support pivoted transverse to said axis, means for securing said support in adjusted angular position about its pivot, a main slide mounted on said support for linear motion and having a way thereon arranged at an angle to the direction of linear motion and with a component longitudinally of said axis, a tool slide mounted for motion in said way, a tool carried by said tool slide in position to operate upon a work piece carried by a spindle at one index position of said carrier, means operatively connected to said main slide for moving said main slide, means carried by said shaft-carried slide operatively connected to said tool slide for moving said tool slide in said way, an extension on said shaft-carried slide, an adjustable abutment carried by said extension in position to operatively engage the outer end of said tool slide and push said tool slide toward the work, and yielding means engaging said tool slide and tending to retract said tool slide in said main slideway.

4. In combination, a machine bed, an indexing carrier supported by said bed, a plurality of rotary work spindles arranged in circular parallel array in said carrier about its indexing axis, a bar arranged coaxially with said carrier, a slide carried by said bar for motion toward and from one end of said carrier, a support pivoted on said bed adjacent to said end of said carrier transverse to said spindles, means carried by said bed and engageable with said support for fixing said support in adjusted angular position, a main slide mounted on said support for linear motion and having a guideway at an angle to the direction of such linear motion, a tool slide mounted in said guideway, a tool on said tool slide positioned to operate on a work piece projecting from said carrier end, a member extending from said bar-carried slide and positioned to impinge upon said tool slide and move said tool slide toward said carrier end, and means for retracting said tool slide when permitted by said bar-carried slide member.

5. In combination, a base, an indexable carrier carried by said base, a plurality of parallel work spindles journaled in said carrier in circular array about the axis of rotation of said carrier, a shaft carried by said base coaxial with said carrier, a slide mounted on said shaft for motion toward and from said carrier, a support pivoted to said base transverse to said axis, means for securing said support in adjusted angular position about its pivot, a main slide mounted on said support for linear motion and having a way thereon arranged at an angle to the direction of linear motion and with a component longitudinally of said axis, a tool slide mounted for motion in said way, a tool carried by said tool slide in position to operate upon a work piece carried by said spindle at one index position of said carrier, the cutting edge of said tool being located adjacent to the pivotal axis of said support, means operatively connected to said main slide for moving said main slide, and means carried by said shaft-carried slide operatively connected to said tool slide for moving said tool slide in said way.

6. In combination, a machine bed, an indexing carrier supported by said bed, a plurality of rotary work spindles arranged in circular parallel array in said carrier about its indexing axis, a bar arranged coaxially with said carrier, a slide carried by said bar for motion toward and from one end of said carrier, a support pivoted on said bed adjacent to one end of said carrier transverse to said spindles, means carried by said bed and engageable with said support for fixing said support in adjusted angular position, a main slide mounted on said support for linear motion and having a guideway at an angle to the direction of such linear motion, a tool slide mounted in said guideway, a tool on said slide positioned to operate on a work piece projecting from said carrier end and having a cutting edge located adjacent to said support pivot, a member extending from said bar-carried slide and in position to impinge upon said tool slide and move said tool slide toward said carrier end, and means for retracting said tool slide when permitted by said bar-carried slide member.

References Cited in the file of this patent

UNITED STATES PATENTS

| | | |
|---|---|---|
| 261,383 | Reinshagen | July 18, 1882 |
| 376,843 | Alpress | Jan. 24, 1888 |
| 1,604,115 | Drissner | Oct. 26, 1926 |
| 1,878,628 | Foster | Sept. 20, 1932 |
| 2,065,933 | Blanchard | Dec. 29, 1936 |
| 2,089,078 | Tyson | Aug. 3, 1937 |
| 2,289,874 | Curtis | July 14, 1942 |
| 2,539,506 | Bura | Jan. 30, 1951 |
| 2,677,296 | Morgan | May 4, 1954 |